July 1, 1969            A. A. PARISH            3,452,678
FLOW RESPONSIVE PUMP PRIME MOVER CUTOFF
Filed Dec. 28, 1966
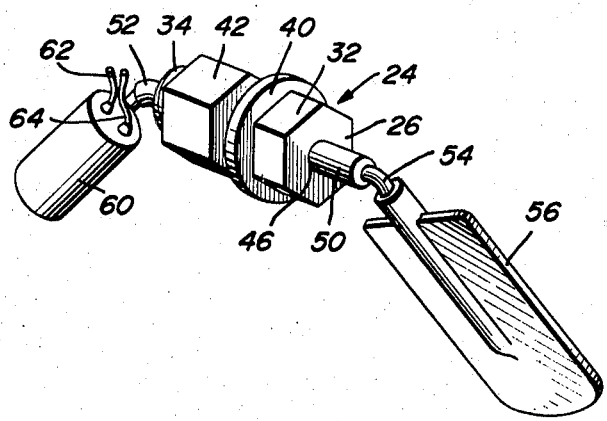
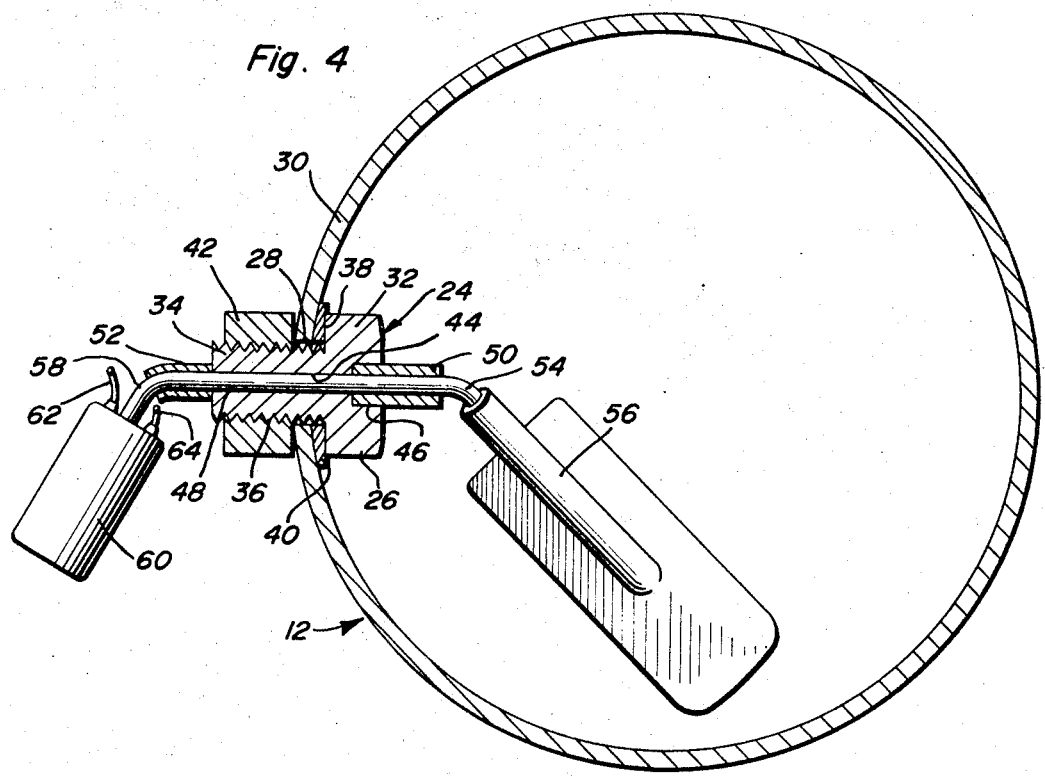
Albert A. Parish
INVENTOR.

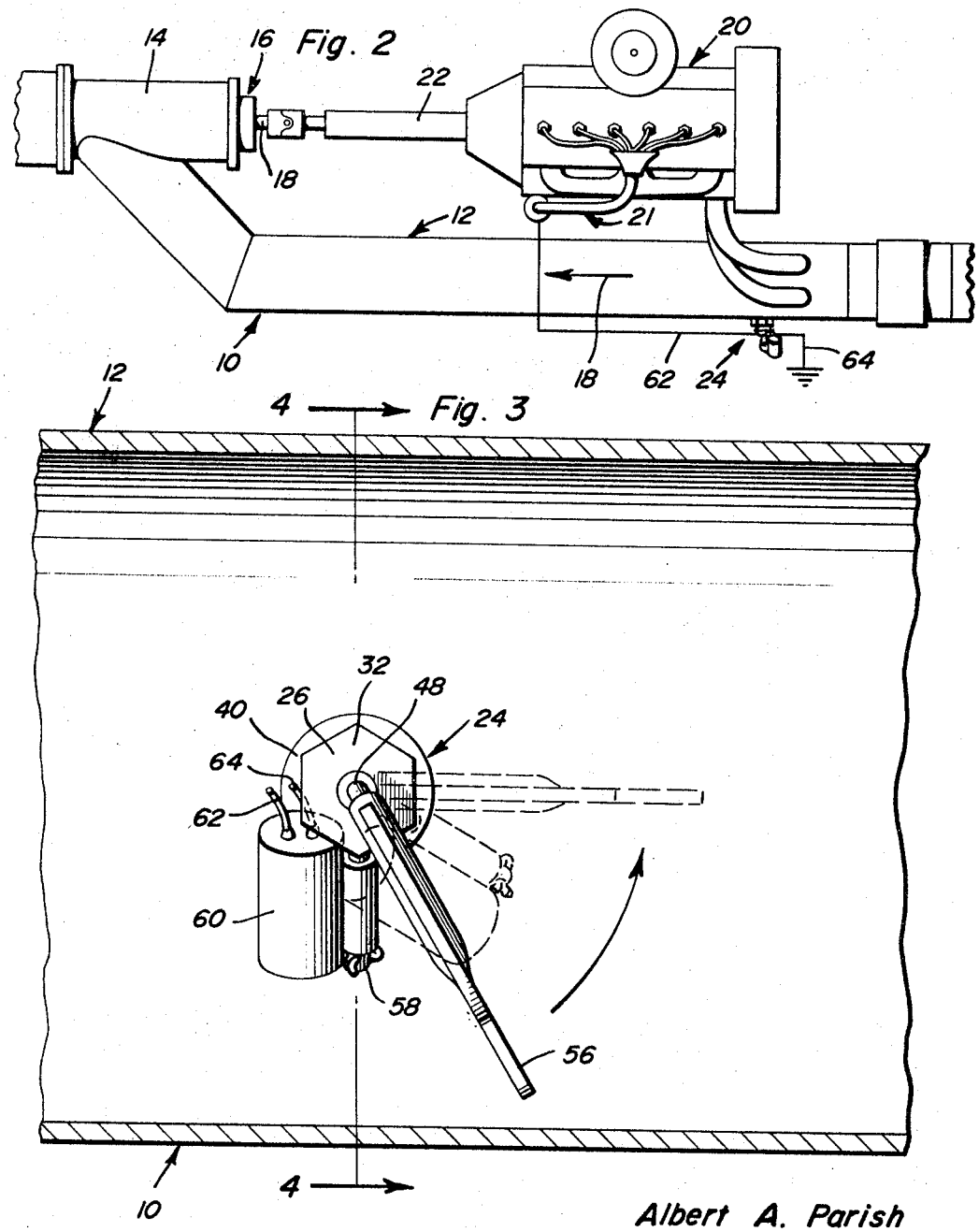

United States Patent Office 3,452,678
Patented July 1, 1969

3,452,678
FLOW RESPONSIVE PUMP PRIME MOVER CUTOFF
Albert A. Parish, Box 441, Earth, Tex. 79031
Filed Dec. 28, 1966, Ser. No. 605,239
Int. Cl. F04b *49/02, 49/08*
U.S. Cl. 103—25                3 Claims

ABSTRACT OF THE DISCLOSURE

A movable fluid flow sensing means journaled through one wall portion of a fluid conduit through which fluid is being pumped by means of a motor driven pump and operatively connected to control means for the motor driving the pump means for termination of operation of the motor means in response to a reduction of fluid flow through the fluid conduit or passage below a predetermined point.

---

This invention relates to a novel and useful control for an irrigation system of the type including a water pipe through which water is being pumped by means of a motor driven pump and which control is responsive to the flow of fluid through the pipe or conduit above a predetermined rate to maintain the motor for the pump in operation but which is operative in response to a predetermined reduction of fluid flow through the pipe to terminate operation of the motor means.

In an irrigation system of the type including a fluid conduit or pipe through which water is being pumped by means of a motor driven pump the supply of water for the pump is sometimes exhausted or at least temporarily interrupted. Further, it is possible that the discharge of water from the pipe through which water is being pumped may be blocked by valves or other means and in these instances, in order to prevent possible overheating of the driving motor of the pump or unnecessary operation of the pump and driving motor therefor, it is desirable to terminate operation of the driving motor for the pump. However, a person capable of controlling the pump driving motor is not always readily available in an area from which the motor operation may be controlled and accordingly, the main object of this invention is to provide an automatic control for the pump driving motor of a water irrigation system operative to terminate operation of the driving motor for the pump in response to a reduction of flow of water through the irrigation pipe or conduit below a predetermined level.

Another object of this invention is to provide an irrigation system control which may be readily adapted to pump motors of both electric and internal combustion-type.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the attachment portion of the instant invention which may be readily mounted upon substantially any section of water conduit or pipe for control of a motor driving a pump pumping water through that pipe;

FIGURE 2 is a fragmentary top plan view of an irrigation system illustrating the manner in which the attachment of FIGURE 1 may be positioned closely adjacent an internal combustion engine driving a water pump for the irrigation system;

FIGURE 3 is an enlarged fragmentary longitudinal vertical sectional view taken substantially upon a plane passing through the portion of water pipe or conduit of FIGURE 2 to which the attachment of FIGURE 1 has been secured; and FIGURE 4 is a vertical sectional view taken substantially upon the plane indicated by the section line 4—4 of FIGURE 3.

Referring now more specifically to the drawings the numeral 10 generally designates a somewhat conventional irrigation system including a water pipe or conduit assembly generally referred to by the reference numeral 12. The assembly 12 includes a section 14 thereof having a water pump generally referred to by the reference numeral 16 operatively associated therewith. The water pump 16 includes an input shaft 18 and is operable to pump water through the conduit or pipe assembly 12 in the direction of the arrow 18 in FIGURE 2. A prime mover generally referred to by the reference numeral 20, and in the form of an internal combustion engine including an electrical ignition system 21, includes an output shaft 22 drivingly coupled to the input shaft 18 and therefore operation of the prime mover 20 will cause water to be pumped through the assembly 12.

The flow responsive pump prime mover cut-off attachment of the instant invention is generally referred to by the reference numeral 24 and includes a tubular fitting 26 which is secured through a suitable bore or opening 28 provided in one side wall portion 30 of the assembly 12. The fitting 26 includes a diametrically enlarged end portion 32 and a small diameter end portion 34 which is externally threaded as at 36. The end portion 32 defines a shoulder 38 and the fitting 26 has the small diameter end portion 34 thereof passed through the opening 28 from the inside of the assembly 12 with a sealing washer 40 being disposed about the end portion 34 adjacent the shoulder 38 and between the latter and the inner surfaces of the assembly 12 disposed about the opening 28. A threaded fastener 42 is threadedly engaged on the end portion 34 outwardly of the wall portion 30 and thus rigidly secures the fastener 26 to the wall portion 30 in fluid-tight sealed engagement therewith.

The fastener 26 has a small diameter bore 44 formed therethrough and including a counterbore 46 at its innermost end.

A support shaft 48 is journaled through the bore 44 and has a resilient sealing sleeve 50 on one end portion seated in the counterbore 46. A second sealing sleeve 52 is disposed on the end portion of the shaft 48 projecting outwardly of the end portion 34 and has one end thereof abuttingly engaged with the end face of the end portion 34. Accordingly, the support shaft 48 is journaled from the fitting 26 through the wall portion 30 in substantially fluid-tight sealed engagement therewith.

The end portion of the shaft 48 on which the sleeve 50 is disposed includes an angulated terminal end portion 54 on which a removable paddle 56 is mounted and the end portion of the shaft 48 on which the sleeve 52 is disposed includes an angulated terminal end portion 58 on which a mercury switch assembly 60 or the like is removably mounted in any convenient manner. The mercury switch assembly 60 includes a pair of conductors 62 and 64 which are electrically connected to the ignition system 21 of the prime mover 20 and a suitable ground, respectively. In this manner, whenever the mercury switch assembly 60 is closed, the ignition system of the prime mover 20 will be grounded and therefore inoperative to support operation of the prime mover 20. However, when the mercury switch assembly 60 is opened, the ignition system of the prime mover 20 will be fully operative and thus the prime mover 20 will continue to operate unless otherwise stopped.

Although the mercury switch assembly 60 is operable to electrically connect the ignition system of the prime mover 20 to a suitable ground to terminate operation of the prime mover 20, the mercury switch assembly 60 could be serially disposed in the primary wiring of the ignition system if the mercury switch assembly 60 was closed when the paddle 56 is in the dotted line position illustrated in FIGURE 3. Further, the mercury switch assembly 60 could readily be operative, by way of a relay switch electrically connected therewith, to terminate operation of an electric motor utilized as a prime mover in lieu of prime mover 20.

In operation, the weight of the paddle 56 and the mercury switch assembly 60 tend to rotate the shaft 48 to the position thereof illustrated in FIGURES 3 and 4 of the drawings, in which position the mercury switch assembly 60 is operative to terminate operation of the prime mover 20. However, when the prime mover 20 is in operation and water is moving through the assembly 12 in the direction indicated by the arrow 18, water striking the paddle 56 causes the latter to be swung to the dotted line position thereof and therefore the shaft 48 to be angularly displaced approximately 60° in which position the mercury switch assembly 60 is tilted to a position in which it is inoperative to terminate operation of the prime mover 20. Therefore, when it is desired to start the prime mover 20, the mercury switch assembly 60 or thhe adjacent end of the support shaft 48 may be grasped to rotate the shaft 48 to the position thereof in which the paddle 56 is disposed in the position illustrated in dotted lines in FIGURE 3 of the drawings. Then, the prime mover 20 may be actuated whereupon it will drive the water pump 16 causing water to be pumped through the assembly 12 in the direction of the arrow 18. Thereafter, continued flow of water through the assembly 12 will maintain the paddle 56 in the position thereof illustrated in dotted lines in FIGURE 3 of the drawings and the prime mover 20 will therefore continue to operate. However, if for any reason the flow of water through the assembly 12 should diminish below a predetermined point, the paddle 56 will swing downwardly from the position thereof illustrated in phantom lines in FIGURE 4 of the drawings to the solid line position thereby tilting the mercury switch assembly 60 to a position operative to terminate operation of the prime mover 20. Termination of operation of the prime mover 20 is of course desirable when the supply of water to the pump 16 is exhausted and when the discharge of water from the water pump 10 is blocked.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination, a pipe adapted to have fluid flow therethrough and having a horizontal and generally radial bore formed through one wall portion thereof, fluid flow responsive switch means including a tubular fitting having a first small diameter end portion extending through said bore and a second diametrically enlarged end portion disposed outwardly of one end of said bore and opposing the adjacent surface portions of said pipe disposed about said one end of said bore, a threaded fastener threadedly engaged on the portion of said small diameter end portion of said tubular fitting projecting outwardly from the other end of said bore, said fastener being tightened on said first end portion to draw said fastener and said enlarged end portion together so as to clamp the portions of said pipe disposed about said bore therebetween and secure said fitting through said bore in fluid tight sealed engagement with said pipe, a one-piece operating shaft journalled through said fitting, said shaft including a central portion and a pair of integral opposite end portions on opposite sides of the central portion and angulated with respect thereto, said shaft being oscillatable between a first rest position and a second position, said end portions being disposed outwardly of the opposite ends of said fitting and inclined downwardly toward their free ends when said shaft is in said rest position, the angulated end portion of said shaft disposed within said pipe including paddle means having a flow impinging surface area disposed transverse and generally parallel to the center line of said pipe when said shaft is in said rest and second positions, respectively, the angulated end portion of said shaft disposed outwardly of said pipe having a tilt switch thereon swingable between positions with said switch open and closed when said shaft is oscillated between said positions thereof, said paddle means and said tilt switch, together with the integral angulated opposite end portions of the shaft, functioning to form weights on the opposite ends of said shaft comprising the sole means operative to rotate said shaft from said second position to said first position in response to insufficient impinging of flow on said surface to counteract the force of gravity on said weights.

2. The combination of claim 1 including fluid pump means operative to pump fluid through said pipe and motor means drivingly connected to said pump means, said motor means including an operation controlling an electrical circuit, said tilt switch being serially connected in said circuit.

3. The combination of claim 2 wherein said tilt switch, when said operating shaft is in said rest position, is operative to act upon said circuit in a manner terminating operation of said motor means.

References Cited

UNITED STATES PATENTS

| 2,203,331 | 6/1940 | Hinsch | 200—81.9 |
| 2,307,304 | 1/1943 | Rudd | 200—81.9 |
| 2,763,746 | 9/1956 | Keeven | 200—81.5 |
| 2,938,090 | 5/1960 | Weber | 200—81.5 |
| 2,981,195 | 4/1961 | Payne et al. | 103—25 |
| 3,072,059 | 1/1963 | Heffel | 200—81.9 |
| 3,299,817 | 1/1967 | Walters et al. | 103—25 |
| 3,028,463 | 4/1962 | Birch | 200—81.9 |
| 3,355,560 | 11/1967 | Murphy et al. | 200—81.9 |
| 3,198,901 | 8/1965 | Kapadi | 200—61.52 |

WILLIAM L. FREEH, *Primary Examiner.*

U.S. Cl. X.R.

200—61.52